United States Patent
Panagopoulos et al.

(10) Patent No.: US 8,136,647 B2
(45) Date of Patent: Mar. 20, 2012

(54) CLUTCH CONTROL METHOD AND CONTROLLER THEREFOR

(75) Inventors: Helene Panagopoulos, Göteborg (SE); Erik Lauri, Mölndal (DE); Svante Karlsson, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 629 days.

(21) Appl. No.: 12/065,734

(22) PCT Filed: Dec. 22, 2005

(86) PCT No.: PCT/SE2005/002040
§ 371 (c)(1),
(2), (4) Date: Mar. 5, 2008

(87) PCT Pub. No.: WO2007/030044
PCT Pub. Date: Mar. 15, 2007

(65) Prior Publication Data
US 2008/0220938 A1    Sep. 11, 2008

Related U.S. Application Data

(60) Provisional application No. 60/596,210, filed on Sep. 8, 2005.

(51) Int. Cl.
*B60W 10/02* (2006.01)
*B60W 10/18* (2006.01)
(52) U.S. Cl. .................................................. 192/13 R
(58) Field of Classification Search .............. 192/13 R, 192/85.57, 85.63, 101, 12 C
See application file for complete search history.

(56) References Cited

U.S. PATENT DOCUMENTS

| 3,614,998 | A | * | 10/1971 | Houtz | 192/13 R |
|---|---|---|---|---|---|
| 4,732,248 | A | | 3/1988 | Yoshimura et al. | |
| 5,277,286 | A | * | 1/1994 | Yamamoto et al. | 192/103 C |
| 5,700,227 | A | * | 12/1997 | Kosik et al. | 477/171 |
| 5,863,277 | A | * | 1/1999 | Melbourne | 477/203 |
| 7,025,708 | B2 | * | 4/2006 | Rieger et al. | 477/171 |
| 2002/0193203 | A1 | * | 12/2002 | Lohr et al. | 477/74 |

FOREIGN PATENT DOCUMENTS

| EP | 0309222 A2 | 3/1989 |
|---|---|---|
| EP | 0375162 A2 | 6/1990 |
| EP | 1251288 A1 | 10/2002 |
| WO | 9825781 A1 | 6/1998 |

OTHER PUBLICATIONS

International Search Report from corresponding International Application PCT/SE2005/002040.
Supp, European Search Report for Corresponding European App. EP 05 82 3729.

* cited by examiner

*Primary Examiner* — Justin Holmes
(74) *Attorney, Agent, or Firm* — WRB-IP LLP

(57) ABSTRACT

A method for clutch disengagement at idling running of a vehicle including an automated manual transmission is characterized in that a rate of the clutch disengagement is controlled responsive to a brake pedal force applied to a brake pedal by a vehicle operator. A clutch disengagement controller controls a rate of clutch disengagement at engine idling running mode. The clutch disengagement controller is connected to a brake pedal sensor sensing a force applied to a brake pedal and to at least one air inlet valve controlling a position of a clutch cylinder. The controller controls opening of said at least one air inlet valve responsive to the force sensed by the brake pedal sensor.

5 Claims, 2 Drawing Sheets

CLUTCH CONTROL METHOD AND CONTROLLER THEREFOR

The present application is the U.S. National Stage application for PCT/SE2005/002040, filed Dec. 22, 2005, which claims priority to U.S. Provisional Application 60/596,210, filed Sep. 8, 2005.

BACKGROUND AND SUMMARY

The present invention relates to a method for clutch disengagement at idle engine speed driving of a vehicle comprising an automated manual transmission.

The present invention further relates to a clutch disengagement controller controlling a rate of clutch disengagement at engine idling running mode. The clutch disengagement controller is connected to a brake pedal sensor sensing a force applied to a brake pedal and to at least one air inlet valve controlling a position of a clutch cylinder governing said clutch disengagement.

In vehicles utilizing automated manual transmission gearboxes, some manufacturers allow the vehicle to continue to run at engine idling speed at low gears, even if the accelerator pedal has been completely released. There is however a problem connected to this engine idling running, namely the disengagement of the clutch, which will occur upon pressing down a brake pedal in the vehicle. In prior art solutions, a clutch disengagement is always done in the same way, namely to disengage the clutch immediately after a brake pedal sensor has sensed a position change of the brake pedal. The clutch disengagement is always performed in the same way, which might lead to unsmooth vehicle stops if only a light pressure is applied to the brake pedal, and to unnecessary engine speed decreases if a high pressure is applied to the brake pedal.

According to the invention, the above problems are solved in that a rate of a clutch disengagement is controlled responsive to a brake pedal force applied to a brake pedal by a vehicle operator.

Furthermore, the invention provides a controller controlling the opening of at least one air inlet valve responsive to the brake force sensed by a brake pedal sensor 150. According to an aspect, the clutch disengagement rate increases as a function of applied brake pedal force.

According to another aspect, the rate of said clutch disengagement is divided into a first disengagement sequence, wherein the rate is controlled to be as high as possible, a second disengagement sequence, wherein the rate is controlled responsive to the force applied to the brake pedal, and a third clutch disengagement sequence, wherein the rate is controlled to be as fast as possible. This aspect is beneficial since it reduces the time from fully engaged to fully disengaged clutch without sacrificing clutch disengagement smoothness.

BRIEF DESCRIPTION OF THE DRAWINGS

In the following, the invention will be described by reference to preferred embodiments of the invention, wherein the appended drawings could be used for further understanding of the invention, and wherein.

DETAILED DESCRIPTION

The following description relates to control of a clutch 130 mounted on a vehicle provided with an automated manual transmission, or AMT. Such transmissions are well known by persons skilled in the art of vehicles, especially those familiar with heavy duty vehicles. As also is well known by persons skilled in the art, the main function of the clutch is to engage and disengage a connection between an engine and a gearbox, which is connected to drive wheels of the vehicle.

Figure 1:
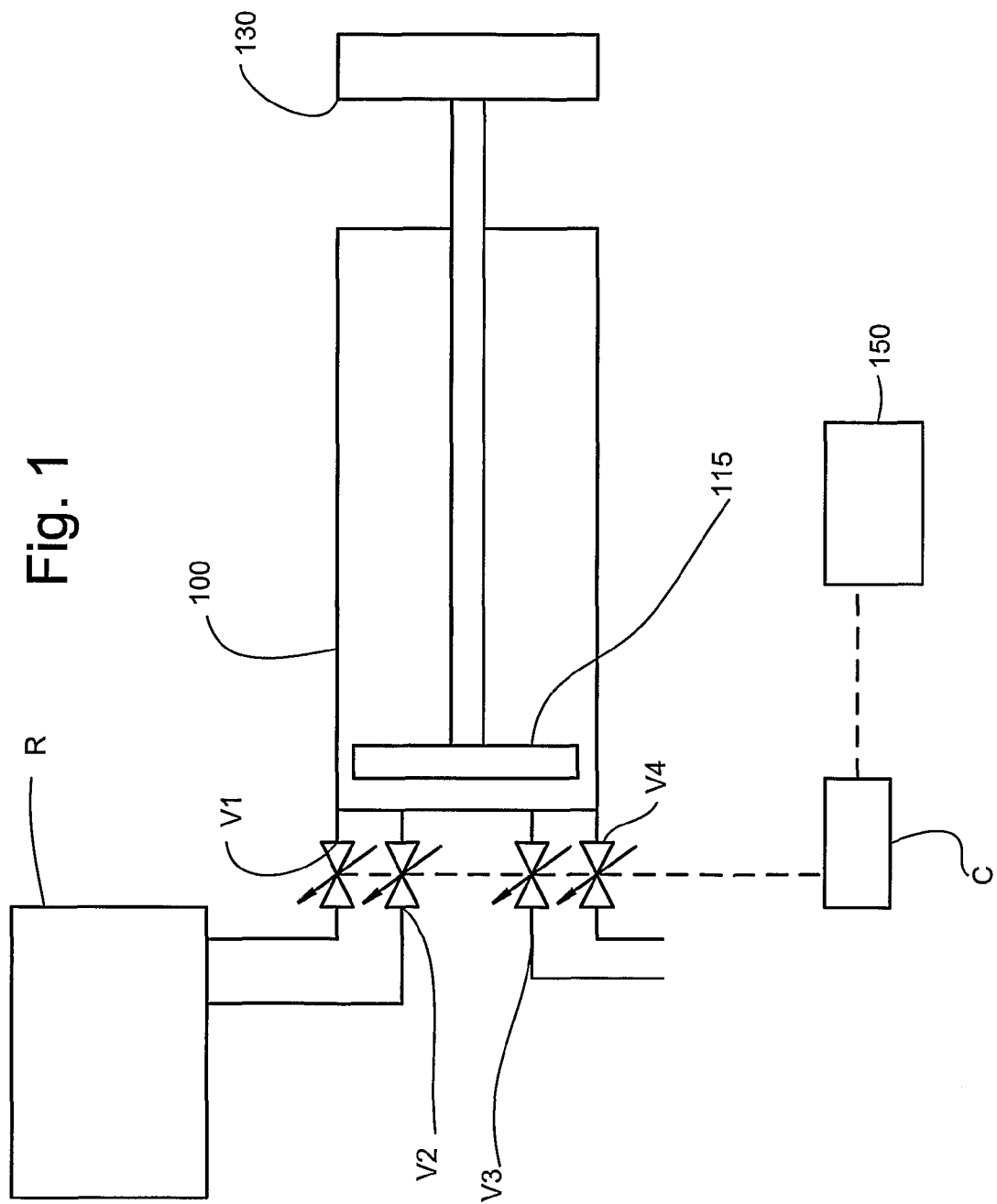
FIG. 1 is a schematic view of a clutch, a clutch cylinder and a controller according to an aspect of the present invention

With reference to FIG. 1, the clutch 130 is controlled by maneuvering a piston 115, which is connected thereto and reciprocably mounted in a clutch cylinder 100, by opening or closing air supply valves V1 and V2, wherein the air supply valve V1 is a small diameter valve and air supply valve V2 is a large diameter valve. The air supply valves V1 and V2 are adapted to open and close a connection between an air supply R and the clutch cylinder 100.

Upon pressurization, the piston 115 will be forced to the right in FIG. 1, due to air pressure acting on the left side of the piston 115. The piston motion to the right will disengage the clutch 130, i.e. disengage the connection between an engine (not shown) and a gearbox (not shown), which in turn is connected to drive wheels (not shown) arranged to propel the vehicle.

The clutch 130 is in its spring-biased rest position when the clutch is engaged, i.e. the clutch 130 biases the piston 110 to the left in FIG. 1. Hence, the clutch 130 will be engaged upon pressure release of the cylinder space to the left of the piston 115. In order to release pressure from this space, two depression valves V3 and V4, wherein V3 is a small diameter valve and V4 is a large diameter valve, are arranged to vent pressure in the cylinder 100 to the atmosphere. The valves V1-V4 are controlled by a controller C. The controller can order a fast clutch disengagement by ordering an opening of both the air supply valves V1 and V2 simultaneously, a somewhat slower clutch disengagement by ordering opening of only the large diameter valve V2, and an even slower clutch disengagement by ordering opening of only the small diameter valve V1. An even slower clutch disengagement can be achieved by pulse width modulation or frequency modulation of the opening of the valve V1 or V2. In a similar manner, clutch engagement can be controlled by opening the valves V3 and V4.

If a manual transmission is used, an operator of the vehicle can and must control clutch disengagement. Usually, the operator strives to achieve minimal fuel consumption, minimal brake wear, minimal brake heating and smooth running. In a vehicle provided with an automated manual transmission, the operator is deprived of the possibility to control the clutch disengagement; hence, the controller must control the clutch to achieve the goals regarding smoothness, fuel consumption and brake overheating. Simultaneously, input from the vehicle operator should affect the clutch control in a wise manner.

The operator input emanates from the brake pedal sensor 150 and a accelerator pedal sensor (not shown), and the control system according to the invention controls clutch disengagement responsive to an applied brake pedal force.

In a commonly used drive situation, the operator allows the engine to drive the vehicle at idling speed, i.e. idle engine speed driving. This is a preferred running condition during e.g. traffic congestions or shortly before a planned stop. During engine idling, an idle speed controller controls the engine to maintain an even idling speed, regardless of applied torque. Hence, it is possible to power the vehicle at engine idling speed, even if the vehicle should travel in an upward slope. Idling speed powering is however not possible at high gears, i.e. gears where a low engine speed results in a relatively high vehicle speed.

As mentioned earlier, a skilled operator of a vehicle having a manual transmission can achieve the desired clutch operation for the above cases. For an automated manual transmission, there is however no input from a clutch pedal (as no clutch pedal is provided).

According to the invention, propelling of the vehicle at engine idling speed continues at a low gear until the operator touches the brake pedal. This means that the vehicle, even after the accelerator pedal has been released, continues to run slowly in the forward direction. After the operator has touched the brake pedal, the clutch will be disengaged, and the vehicle will decelerate.

According to the invention, engine idling running is regarded to exist if the engine has an engine speed below a predetermined threshold value, e.g. 750 rpm for an engine having an idling speed of 600 rpm. The predetermined threshold value could of course be higher or lower than 750 rpm.

According to the invention, the clutch disengagement is controlled responsive to an applied brake pedal force. If the applied brake pedal force is such that a rapid braking of the vehicle is ordered from the vehicle operator, a rapid clutch disengagement is affected by the controller; if only a light brake pedal pressure is applied, a slower clutch disengagement is used. As mentioned previously in the text, a slower clutch disengagement gives a smoother operation.

Figure 2:
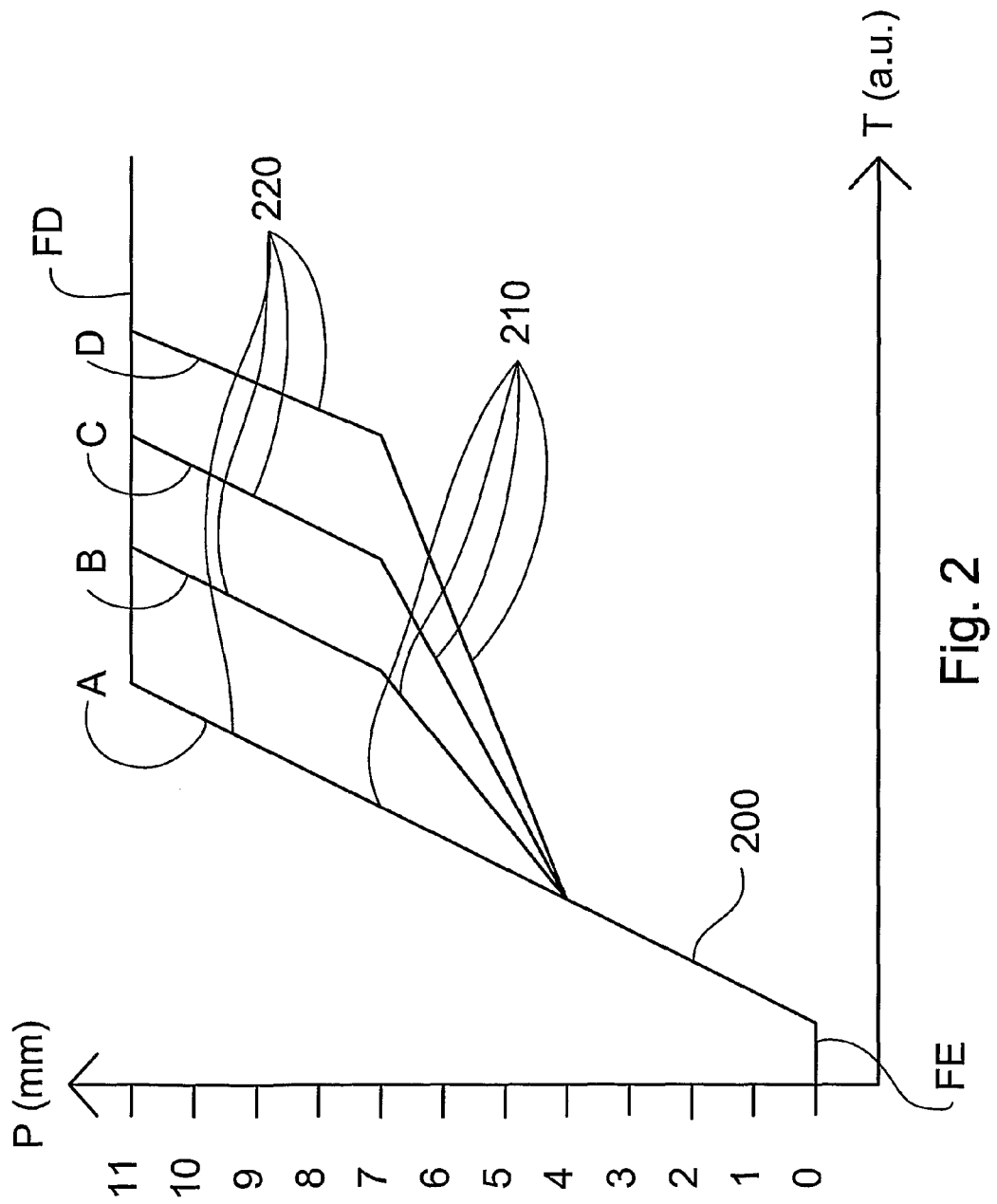
FIG. 2 is a plot showing clutch piston position as a function of time for various clutch disengagement rates.

In FIG. 2, some different clutch disengagement graphs are shown, wherein graph A represents a fast clutch disengagement and graph D a slow disengagement, wherein the horizontal axis represents a time T and the vertical axis a piston position and wherein a position FE means a fully engaged clutch and a position FD means a fully disengaged clutch. As can be seen, a rapid clutch disengagement, such as represented by graph A, has a steep inclination, whereas a slow clutch disengagement, such as represented by graph D, has a less steep inclination. Two graphs B and C are shown as examples of clutch disengagements with intermediate disengagement speeds.

According to the invention, the clutch disengagement is controlled as a function of applied brake pedal force when the engine speed is under the threshold value.

Whenever the brake pedal is activated, i.e. pressed down, a clutch disengagement commences; in a first disengagement sequence, in this case from piston position 0 to 4 mm (graph portion 200), both air inlet valves V1 and V2 will be open in order to get a clutch disengagement initiation which is as fast as possible. In a second disengagement sequence, in this case from about 4 mm to about 7 mm, in FIG. 2 denoted by 210, information about applied brake pedal force will be used to control the rate of clutch disengagement. If the applied brake pedal force is such that a slow retardation of the vehicle is ordered, a slow clutch disengagement is provided by opening only the small diameter inlet valve V2, or, if an even slower clutch disengagement is wanted, by pulse width controlling opening of any inlet air valve V1 or V2, e.g. by pulse width modulation. Another option is to frequency modulate the opening of the inlet air valve. If a fast clutch disengagement is desired, which is the case when a large force is applied to the brake pedal, both air inlet valves could be open also during this second disengagement sequence. In a third disengagement sequence, in this case from about 7 to about 11 mm (denoted by 220 in FIG. 2), both air inlet valves could be open simultaneously, in order to give an as fast clutch disengagement as possible. In an aspect of the invention, the rate of clutch disengagement is controlled as a function of brake pedal information, wherein the fastest clutch disengagement is used for brake pedal positions representing more than 30% of maximum braking. For brake pedal positions representing less than 30% of maximum brake torque, a second disengagement sequence lasting up to about two seconds could be used, if the applied brake pedal force represents a minimum braking.

Should the applied brake pedal force change during a clutch disengagement sequence, the second clutch disengagement sequence might be changed accordingly; this is preferred if the brake pedal position is altered towards a position representing more braking than the previous position. Should the applied brake pedal force be altered towards a position representing less braking than the original position, the second clutch disengagement sequence could either be changed accordingly, or be maintained to represent the previous position representing a higher brake force.

The above division of the clutch disengagement into the first, second and third sequences is not coincidental; firstly, at engine idling speed, the maximum engine torque is significantly lower than at higher engine speeds. This ensures that no clutch slipping will occur during the first disengagement sequence, even if the largest transferable clutch torque is significantly reduced during the first disengagement sequence. Secondly, the transferable torque at clutch positions exceeding 7 mm, i.e. during the third clutch disengagement sequence, is less than about 30 Nm; at such low transferable torques, clutch slipping, i.e. a rotational speed difference between an incoming shaft and an outgoing shaft of the clutch, wherein the clutch connects said shafts, is imminent, meaning that there is no idea not to use a fastest possible clutch disengagement during the third clutch disengagement. Hence, clutch slipping is most likely to occur during the second disengagement sequence, which, as mentioned, is the sequence during which disengagement is controlled as a function of applied brake pedal force.

The invention claimed is:

1. Method for clutch disengagement at idle engine speed driving of a vehicle comprising an automated manual transmission, comprising controlling a rate of the clutch disengagement responsive to a brake pedal force applied to a brake pedal by a vehicle operator, wherein the rate of the clutch disengagement is divided into a first disengagement sequence, wherein the rate is controlled to be as fast as possible, a second disengagement sequence, wherein the rate is controlled responsive to the force applied to the brake pedal, and a third clutch disengagement sequence, wherein the rate is controlled to be as fast as possible.

2. The method according to claim 1, wherein the clutch disengagement rate increases as a function of applied brake pedal force.

3. The method according to claim 2, wherein the idling running is determined to exist at engine speeds under about 750 rpm and a low gear.

4. The method according to claim 1, wherein the idling running is determined to exist at engine speeds under about 750 rpm and a low gear.

5. The clutch disengagement controller according to claim 4, wherein the controller is an electrical control unit comprising executable software.

* * * * *